(12) United States Patent
Döring et al.

(10) Patent No.: US 8,176,731 B2
(45) Date of Patent: May 15, 2012

(54) EXHAUST GAS AFTERTREATMENT SYSTEM

(75) Inventors: Andreas Döring, München (DE); Eberhard Jacob, Krailling (DE)

(73) Assignee: MAN Truck & Bus AG, München (DE)

( * ) Notice: Subject to any disclaimer, the term of this patent is extended or adjusted under 35 U.S.C. 154(b) by 1044 days.

(21) Appl. No.: 12/150,026

(22) Filed: Apr. 24, 2008

(65) Prior Publication Data
US 2009/0145117 A1 Jun. 11, 2009

(30) Foreign Application Priority Data
Apr. 25, 2007 (DE) .......................... 10 2007 019 460

(51) Int. Cl.
*F01N 3/10* (2006.01)
(52) U.S. Cl. ........................................ 60/301; 60/297
(58) Field of Classification Search .................. 60/286, 60/287, 295, 297, 301
See application file for complete search history.

(56) References Cited

U.S. PATENT DOCUMENTS

| | | | |
|---|---|---|---|
| 4,902,487 A | 2/1990 | Cooper et al. | |
| 5,166,432 A * | 11/1992 | Weitkamp et al. | 564/106 |
| 6,497,851 B1 * | 12/2002 | Hu et al. | 423/213.5 |
| 6,805,849 B1 | 10/2004 | Andreasson et al. | |
| 6,878,359 B1 * | 4/2005 | Mathes et al. | 423/239.1 |
| 6,928,806 B2 | 8/2005 | Tennison et al. | |
| 6,983,589 B2 | 1/2006 | Lewis et al. | |
| 2003/0072694 A1 | 4/2003 | Hodgson et al. | |
| 2004/0045284 A1 | 3/2004 | Ripper et al. | |
| 2004/0065068 A1 * | 4/2004 | Otsubo et al. | 55/523 |
| 2004/0098973 A1 | 5/2004 | Tennison et al. | |
| 2004/0121908 A1 * | 6/2004 | Tanabe | 502/439 |
| 2004/0128982 A1 * | 7/2004 | Patchett et al. | 60/274 |
| 2004/0253161 A1 * | 12/2004 | Higgins | 423/235 |
| 2005/0013756 A1 * | 1/2005 | Amou et al. | 423/239.1 |

(Continued)

FOREIGN PATENT DOCUMENTS
DE 40 38 054 6/1992
(Continued)

OTHER PUBLICATIONS

Proceedings of the National Academy of Sciences of the United States of America, vol. 99, No. 9, Supplement 2: Arthur M. Sackler Colloquium of the National Academy of Sciences. Sackler Colloquium on Nanoscience: Underlying Physical Concepts and Phenomena (Apr. 30, 2002), pp. 6476-6481.*

*Primary Examiner* — Thomas Denion
*Assistant Examiner* — Patrick Maines
(74) *Attorney, Agent, or Firm* — Cozen O'Connor

(57) ABSTRACT

Exhaust gas aftertreatment system for internal combustion engines operated with a lean mixture, wherein nitrogen oxides are reduced by an SCR catalyst, and particulates are removed by a particle separator or filter. A thermolysis catalyst is located near the engine in the exhaust gas split stream downstream of the supply point of the reducing agent. At temperatures above 135° C., this thermolysis catalyst vaporizes the water component of the aqueous urea solution. It contains a catalyst material that is thermally stable at exhaust gas temperatures occurring near the engine and preferentially reacts with the urea to form isocyanic acid. A hydrolysis catalyst is located in the exhaust gas stream downstream of the return of the split stream into the main stream of exhaust gas. The hydrolysis catalyst converts the isocyanic acid formed during thermolysis to ammonia and carbon dioxide using water vapor formed in the thermolysis catalyst.

12 Claims, 2 Drawing Sheets

U.S. PATENT DOCUMENTS

| | | | |
|---|---|---|---|
| 2005/0031514 A1 | 2/2005 | Patchett et al. | |
| 2005/0091968 A1 | 5/2005 | Van Nieuwstadt et al. | |
| 2005/0103099 A1 | 5/2005 | Van Nieuwstadt et al. | |
| 2005/0232830 A1* | 10/2005 | Bruck | 422/180 |
| 2005/0284138 A1* | 12/2005 | Imai et al. | 60/295 |
| 2006/0059900 A1* | 3/2006 | Harada et al. | 60/297 |
| 2006/0075740 A1* | 4/2006 | Twigg et al. | 60/285 |
| 2006/0257303 A1* | 11/2006 | Telford | 423/239.1 |

FOREIGN PATENT DOCUMENTS

| | | |
|---|---|---|
| DE | 101 55 675 A1 | 5/2003 |
| DE | 102 6 028 A1 | 8/2003 |
| DE | 102 26 975 | 1/2004 |
| DE | 10 2004 021 193 A1 | 12/2004 |
| DE | 10 2005 012066 | 9/2006 |
| DE | 10 2005 039630 | 3/2007 |
| EP | 0 169 939 | 2/1986 |
| EP | 1 072 765 | 1/2001 |
| EP | 1 357 267 | 10/2003 |
| JP | 2006 183507 | 7/2006 |
| WO | WO 2007003380 A1 * | 1/2007 |
| WO | WO 2007022926 A1 * | 3/2007 |

* cited by examiner

EXHAUST GAS AFTERTREATMENT SYSTEM

BACKGROUND OF THE INVENTION

1. Field of the Invention

The object of the invention is an exhaust gas aftertreatment system in internal combustion engines operated with a lean mixture, such as diesel engines and gasoline engines with direct injection, wherein the nitrogen oxides are reduced by means of an SCR catalyst, and the particulates are reduced by means of a particle separator or a particle filter.

2. Description of the Related Art

In addition to solid particulates, nitrogen oxides are among the limited exhaust gas components which are formed during combustion processes and whose allowed emissions are being reduced to ever lower levels. To minimize these exhaust gas components in internal combustion engines operated in motor vehicles, various methods are now being used. The lowering of nitrogen oxide levels is usually accomplished with catalysts; in oxygen-rich exhaust gas, a reducing agent is additionally needed to increase the selectivity and the $NO_x$ conversion rates. These processes are collectively known as SCR processes (SCR=selective catalytic reduction). They have been used for many years in power plants and more recently in internal combustion engines. DE 34 28 232 A1 provides a detailed description of processes of this type. Examples of suitable SCR catalysts include mixed-metal oxides that contain $V_2O_5$, for example, in the form of $V_2O_5/WO_3/TiO_2$. $V_2O_5$ is typically present in these catalysts in amounts of 0.2 to 3%. Reducing agents that have found practical use are ammonia or ammonia-cleaving compounds, such as urea or ammonium formate in solid or dissolved form. In this regard, 1 mole of ammonia is required for the reaction of 1 mole of nitric oxide.

$$4NO+4NH_3+O_2 \rightarrow 4N_2+6H_2O \qquad (1)$$

If a platinum-containing NO oxidation catalyst for forming $NO_2$ is used upstream of the SCR catalysts, $$2NO+O_2 \leftrightarrow 2NO_2 \qquad (2)$$

the SCR reaction can be considerably accelerated, and the low-temperature activity can be appreciably increased.

$$NO+2NH_3 \rightarrow 2N_2+3H_2O \qquad (3)$$

In internal combustion engines operated in motor vehicles, nitrogen oxide reduction by means of the SCR process turns out to be difficult, because varying operating conditions make the quantitative metering of the reducing agent difficult. On the one hand, it is desired that the greatest possible conversion of nitrogen oxides be realized, but on the other hand, it is necessary to make sure that there is no emission of unconsumed ammonia. To this end, an ammonia-blocking catalyst is often used downstream of the SCR catalyst to react with excess ammonia to form nitrogen and water vapor. In addition, the use of $V_2O_5$ as the active material for the SCR catalyst can then lead to deactivation problems if the exhaust gas temperature at the SCR catalyst is greater than 650° C. For this reason, $V_2O_5$-free iron or copper zeolites are used for high-temperature applications.

To minimize the solid particulates, either so-called particle separators or particle filters are used both in the power plant sector and in motor vehicles. A typical system with a particle separator for use in motor vehicles is described, for example, in EP 1 072 765 A1. Systems of this type differ from systems with particle filters in that the diameter of the channels of the particle separator is much greater than the diameter of the largest particles that are present, whereas in particle filters the diameter of the filter channels is of the same order of magnitude as the diameter of the particles. As a result of this difference, particle filters are prone to clogging, which increases exhaust gas back pressure and reduces engine output. Particle separators of the aforementioned type can be improved if, as described in US 2003/0072694 the exhaust gas can also flow through the individual filter layers transversely to the main direction of flow of the exhaust gas. In this way, thorough mixing and thus homogenization of the exhaust gas stream are realized. U.S. Pat. No. 4,902,487 describes a system and a process that use a particle filter instead of a particle separator of the type described above. The aforementioned systems and processes are distinguished by the fact that the oxidation catalyst, which is usually a catalyst that contains platinum as the active material and is located upstream of the particle separator or particle filter, oxidizes the nitric oxide in the exhaust gas with the aid of the residual oxygen that is also present to form nitrogen dioxide, which in turn reacts with the carbon particulates in the particle separator or particle filter to form $CO$, $CO_2$, $N_2$, and $NO$. In this way, there is continuous removal of the deposited solid particulates, and regeneration cycles, which must be carried out by complicated means in other systems, are thus eliminated.

$$2NO_2+C \rightarrow 2NO+CO_2 \qquad (4)$$

$$NO_2+C \rightarrow NO+CO \qquad (5)$$

$$2C+2NO_2 \rightarrow N_2+2CO_2 \qquad (6)$$

To comply with future exhaust gas regulations, the simultaneous use of systems for reducing nitrogen oxide emissions and systems for reducing solid particulate emissions is necessary. Various systems and processes for this are already known.

U.S. Pat. No. 6,928,806 describes a system that consists of an oxidation catalyst, an SCR catalyst downstream of it, and a particle filter downstream of the SCR catalyst in the exhaust gas stream. The reducing agent for the selective catalytic reaction that takes place in the SCR catalyst is supplied directly upstream of the SCR catalyst by means of a urea injection device controlled as a function of operating parameters of the internal combustion engine. A disadvantage of this system is that the nitrogen dioxide produced in the oxidation catalyst is virtually completely consumed by the selective catalytic reduction in the SCR catalyst and thus is not available for the reaction of the solid particulates deposited in the downstream particle filter. Therefore, the regeneration of the particle filter must be accomplished in a complicated way by cyclical heating of the exhaust gas stream by enriching the exhaust gas stream with uncombusted hydrocarbons. This is accomplished either by adding oil to the combustion mixture or injecting fuel upstream of the particle filter. On the one hand, a system of this type for regenerating the particle filter is complicated and thus expensive, and, on the other hand, the cyclical regeneration of the particle filter, which is located at the end of the system, produces further foreign substances that can no longer be removed from the exhaust gas. In addition, when particle filters are used, the filters can become clogged by oil incineration ash, so that the filters must be removed and cleaned at regular intervals.

Another combination of a particle filter and a system for selective catalytic reduction is disclosed by U.S. Pat. No. 6,805,849. The system described there consists of an oxidation catalyst installed in the exhaust gas stream, which increases the fraction of nitrogen dioxide in the exhaust gas, a fine particle filter downstream of the oxidation catalyst, a reservoir for the reductant fluid, an injection device for the reductant fluid, which is located downstream of the fine particle filter, and an SCR catalyst located in the stream of exhaust gas downstream of the point of injection of the reductant fluid. Although the system described above allows continuous reaction of the solid particulates (soot) deposited in the fine particle filter by means of the nitrogen dioxide produced in the oxidation catalyst, it has a serious disadvantage. The particle filter causes cooling of the exhaust gases, so that, e.g., when the now standard commercial reductant fluid known as AdBlue is used, the exhaust gas temperature is too low, especially when the internal combustion engine is in the start-up phase or is being operated in the low power range, to produce ammonia from the 33% aqueous urea solution without the simultaneous production of problematic byproducts.

In connection with the decomposition of urea $((NH_2)_2CO)$ into ammonia $(NH_3)$, it is well known that this occurs in two stages under optimum conditions (temperatures above 350° C.). First, thermolysis, i.e., thermal decomposition, of urea occurs according to the following equation:

$$(NH_2)_2CO \rightarrow NH_3 + HNCO \qquad (7)$$

Hydrolysis then occurs to a small extent, i.e., decomposition of isocyanic acid (HNCO) to ammonia $(NH_3)$ and carbon dioxide $(CO_2)$ according to the following equation:

$$HNCO + H_2O \rightarrow NH_3 + CO_2 \qquad (8)$$

Since the reducing agent is present in the form of an aqueous solution when AdBlue is used, this water must evaporate before and during the actual thermolysis and hydrolysis.

If the temperatures prevailing in the above reactions according to equations (7) and (8) are below 350° C. or if heating takes place at only a slow rate, it is known from DE 40 38 054 A1 that principally solid, infusible cyanuric acid is formed by trimerization of the isocyanic acid formed by (7) in accordance with the following equation:

$$3HNCO \underset{> 350° C.}{\overset{< 350° C.}{\rightleftarrows}} (HNCO)_3 \qquad (9)$$

which causes clogging of the downstream SCR catalyst. As noted in the above-cited DE 40 38 054 A1, this problem can be remedied by passing the stream of exhaust gas, which is loaded with the reducing agent, over a urea decomposition and hydrolysis catalyst. The exhaust gas temperature at which quantitative hydrolysis becomes possible can be depressed to 160° C. in this way. The design and composition of a corresponding catalyst are described in the cited publication, as are the design and function of an SCR catalyst system provided with a hydrolysis catalyst.

SUMMARY OF THE INVENTION

Proceeding from the prior art described above, the objective of the invention is to describe an exhaust gas aftertreatment system for reducing nitrogen oxides and particulates in internal combustion engines operated with a lean mixture, which avoids the disadvantages of previously known systems and in which especially the cleavage of $NH_3$ from the reducing agent occurs, if at all possible, under all operating conditions without the formation of problematic reaction products, so that the conversion rate of the nitrogen oxides and possibly the deposition rate and the conversion rate of the particulates are optimized.

The solution is based on a previously known exhaust gas aftertreatment system for reducing nitrogen oxides and particulates in internal combustion engines operated with a lean mixture, wherein the nitrogen oxides are reduced by means of an SCR catalyst, and the particulates are reduced by means of a particle separator or a particle filter. In systems of this type, the exhaust gas stream of the internal combustion engine passes through an oxidation catalyst, which converts at least a portion of the nitric oxide present in the exhaust gas stream to nitrogen dioxide. The reducing agent is introduced into the exhaust gas from a reservoir for a reducing agent by means of a metering device for the reducing agent, wherein the reducing agent is metered parallel to the oxidation catalyst into a split stream split from the exhaust gas stream upstream of the oxidation catalyst and returned to the exhaust gas stream downstream of the oxidation catalyst. The reducing agent is an aqueous urea solution that splits off ammonia downstream of the supply point by means of the hot exhaust gas.

In a departure from the exhaust gas aftertreatment systems customarily used until now, a thermolysis catalyst is located near the engine in the exhaust gas split stream downstream of the supply point of the reducing agent. At an exhaust gas temperature above 135° C., this thermolysis catalyst vaporizes the water component of the aqueous urea solution. It contains a catalyst material that is thermally stabilized with respect to the exhaust gas temperatures occurring near the engine and preferentially reacts with the urea to form isocyanic acid. At least one hydrolysis catalyst is located in the exhaust gas stream downstream of the thermolysis catalyst and some distance from it, i.e., downstream of the return of the exhaust gas partial stream into the main stream of the exhaust gas. The hydrolysis catalyst contains a catalyst material that converts the isocyanic acid formed during the thermolysis to ammonia and carbon dioxide with the aid of the water vapor formed in the thermolysis catalyst. Due to the division of the reaction of the aqueous urea solution into ammonia into two partial processes, which take place in separate catalysts that are spaced some distance apart and are specifically optimized to the respective partial processes, a complete reaction of the aqueous urea solution can be realized in an advantageous way. Moreover, especially because the thermolysis catalyst can be placed close to the engine, even when very little installation space is available, e.g., in commercial vehicles with appropriate internal combustion engines, complete thermolysis occurs even at low exhaust gas temperatures, e.g., in the start-up phase of a commercial vehicle. The distance between the thermolysis catalyst and the hydrolysis catalyst results in thorough mixing of the exhaust gas with the isocyanic acid, so that there is a homogeneous distribution of the isocyanic acid for hydrolysis in the hydrolysis catalyst. This advantageously avoids the problem that isocyanic acid cannot be reacted in the hydrolysis catalyst due to local accumulations and instead undergoes trimerization to cyanuric acid, which would clog the downstream components of the exhaust gas system. This also avoids the formation of so-called ammonia "streaks", i.e., local accumulations of ammonia, which are a disadvantage in the downstream nitric oxide reduction in the SCR catalyst, because they have a negative impact on the conversion rate. Furthermore, the system comprising the thermolysis catalyst and the hydrolysis catalyst located some distance from it makes it possible to reduce the total catalyst volume for the reaction of the aqueous urea solution into ammonia.

Downstream of the hydrolysis catalyst, a particle separator or particle filter is located in the exhaust gas stream, which reacts with the soot particles deposited in the particle separator or particle filter to form carbon monoxide, carbon dioxide, nitrogen, and nitric oxide by means of the nitrogen dioxide present in the exhaust gas stream. The actual reduction of the nitrogen oxides occurs downstream of the particle separator or particle filter by means of an SCR catalyst, which reduces the nitrogen oxides contained in the exhaust gas stream by selective catalytic reduction to nitrogen and water vapor with the aid of the cleaved ammonia.

Due to the placement of the thermolysis catalyst near the engine, it is advantageous to produce it from a thermally stable material and to shape it in such a way that the droplets of reductant injected into the exhaust gas, which are strongly accelerated by the high exhaust gas velocities in this region, do not cause any damage due to droplet impact when they strike the surface of the thermolysis catalyst.

Effective materials for the thermolysis catalyst include substances from the group that comprises titanium dioxide, silicon dioxide, aluminum oxide, tungsten oxide, and zeolite. In this regard, the thermolysis is carried out preferentially by titanium dioxide, while silicon dioxide, aluminum oxide, and tungsten oxide, alone or in combination, have a thermally stabilizing effect.

To have a positive effect on the evaporation of the water component of the aqueous urea solution, especially at low catalyst temperatures, it is advantageous if the thermolysis catalyst has a porosity that promotes the evaporation of the water component of the aqueous urea solution. The pores greatly increase the effective surface available for evaporation of the water component.

To realize the most homogeneous possible distribution of the ammonia produced in the hydrolysis catalyst, it is advantageous if the hydrolysis catalyst has a carrier coated with the catalyst material, through which the exhaust gas can flow both in the main direction of flow of the exhaust gas and transverse to this direction in such a way that there is thorough mixing of the exhaust gas stream with the ammonia present in it. This can be achieved if the carrier consists, e.g., of a packet of metal foils with alternating layers of corrugated and smooth foils, so that channels are formed, through which the exhaust gas can flow in the main direction of flow, and the metal foils have openings that allow the exhaust gas to flow through the packet transversely to the main direction of flow. A hydrolysis catalyst constructed in this way for turbulent flow reliably prevents local accumulations of ammonia.

The catalytic coating of a hydrolysis catalyst advantageously consists of a washcoat, which contains at least one of the substances titanium dioxide, silicon dioxide, aluminum oxide, tungsten oxide, or zeolite.

To increase the overall particle separation rate of the exhaust gas aftertreatment system, it is advantageous if the hydrolysis catalyst has turbulence zones and low-flow zones with respect to the stream of exhaust gas, such that the hydrolysis catalyst deposits soot particles entrained with the stream of exhaust gas in the low-flow zones and reacts with them to form carbon monoxide, carbon dioxide, nitrogen, and nitric oxide with the aid of the nitrogen dioxide contained in the exhaust gas stream.

In practice, certain principles in the selection of the catalyst materials for the thermolysis catalyst and the hydrolysis catalyst have crystallized out as advantageous with respect to optimization of the total conversion rate of the aqueous urea solution into ammonia. For example, it is advantageous if the thermolysis catalyst contains a smaller fraction of titanium dioxide than the hydrolysis catalyst. It is also advantageous if the thermolysis catalyst contains a higher fraction of silicon dioxide than the hydrolysis catalyst.

The crystalline structure of the titanium dioxide also has an impact with respect to optimization of the overall system. For example, it is advantageous if the percentage of titanium dioxide in the rutile modification is higher and/or its percentage in the anatase modification is lower in the thermolysis catalyst than in the hydrolysis catalyst.

It has been found to be especially advantageous if the percentage of anatase in the thermolysis catalyst is 0-30% and/or its percentage of rutile is 8-80% and/or its percentage of silicon dioxide is 30-100%.

Moreover, it is advantageous if the percentage of anatase in the hydrolysis catalyst is 50-80% and/or its percentage of rutile is 0-30% and/or its percentage of silicon dioxide is 20-60%.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PREFERRED EMBODIMENTS

Figure 1:
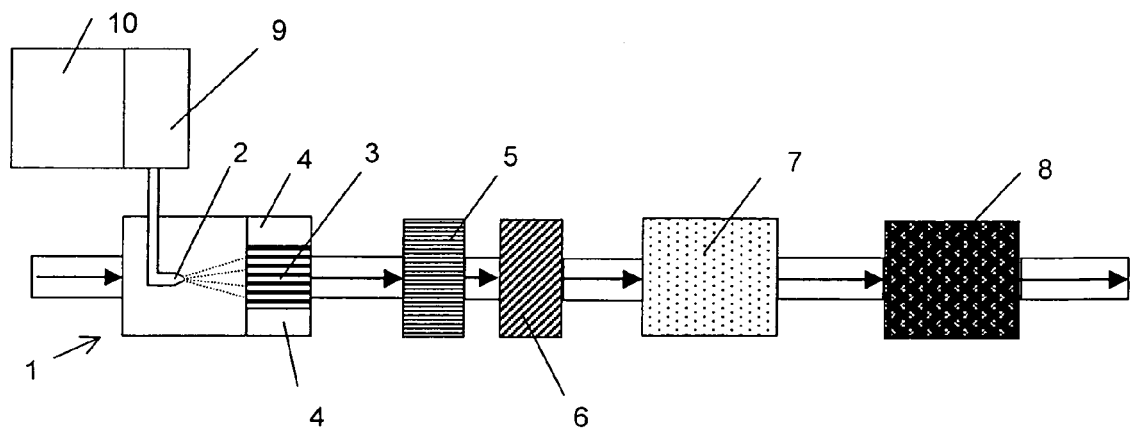
FIG. 1 shows a first exhaust gas aftertreatment system with split-stream thermolysis and main stream hydrolysis.

A system for selective catalytic reduction and for the reduction of particulates in the exhaust gas of an internal combustion engines is shown schematically in FIG. 1. The exhaust gases produced by combustion processes in an internal combustion engine (not shown) are symbolized in the drawings by arrows. The exhaust gases first enter an exhaust gas treatment tract 1, in which a reducing agent is added to the hot exhaust gas as close as possible to the engine. The reducing agent is an aqueous urea solution, i.e., the reductant customarily used in actual practice in motor vehicles with an SCR catalyst. The reducing agent is metered as a function of operating parameters of the internal combustion engine under the control of an engine control unit (not shown) in such a way that a metering device 9, which is controlled as a function of operating parameters of the internal combustion engine and removes the aqueous urea solution from a reservoir 10, injects by way of a nozzle 2 the aqueous urea solution into the stream of exhaust gas in predetermined amounts, depending on the operating state of the internal combustion engine. Downstream of the injection point, a thermolysis catalyst 3 and an oxidation catalyst 4 are arranged parallel to each other in the exhaust gas stream. The aqueous urea solution is injected in such a way that it enters only the split stream that passes through the thermolysis catalyst 3. The function of the thermolysis catalyst 3 is to convert the aqueous urea solution to water vapor and isocyanic acid, which takes place according to the following equation:

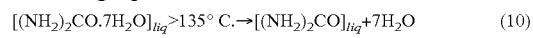

$$[(NH_2)_2CO \cdot 7H_2O]_{liq} > 135°\,C. \rightarrow [(NH_2)_2CO]_{liq} + 7H_2O \qquad (10)$$

evaporation of the water and

$$[(NH_2)_2CO]_{liq} \rightarrow NH_3 + HNCO \qquad (11)$$

urea thermolysis.

The function of the oxidation catalyst 4, which is arranged parallel to the thermolysis catalyst 3, consists in oxidizing a portion of the nitric oxide present in the exhaust gas to nitrogen dioxide by means of the excess oxygen present in the exhaust gas in accordance with equation (2). The nitrogen dioxide produced by this reaction is used, on the one hand, in the reduction of the particulates and, on the other hand, in the downstream SCR reaction, as described in greater detail below.

Downstream of the parallel system consisting of the thermolysis catalyst 3 and the oxidation catalyst 4 and separated some distance especially from the thermolysis catalyst 3, at least one hydrolysis catalyst 5 is arranged in the exhaust gas stream. The hydrolysis catalyst 5 contains a catalyst material that converts the isocyanic acid formed during the thermolysis to ammonia and carbon dioxide with the aid of the water vapor formed in the thermolysis catalyst according to reaction (8).

A particle separator 6, which removes the soot particles present in the exhaust gas, is arranged downstream of the hydrolysis catalyst 5. The soot particles thus retained in the particle separator 6 are continuously reacted to form carbon monoxide, carbon dioxide, nitrogen, and nitric oxide by the nitrogen dioxide produced upstream by means of the oxidation catalyst 4, so that complicated regeneration cycles for the particle separator 6 are unnecessary.

The actual selective catalytic reduction of the nitrogen oxides occurs in the SCR catalyst 7, which is located downstream of the particle separator. The SCR catalyst 7 is intended to convert the greatest possible portion of the nitrogen oxides ($NO_x$) present in the exhaust gas to nitrogen and water vapor and at the same time to accomplish this with a high degree of selectivity of the reduction, with no excess ammonia ($NH_3$) remaining in the stream of exhaust gas. In this SCR reduction reaction, the residual nitrogen dioxide possibly still present in the exhaust gas stream is more reactive than the residual NO present in the exhaust gas. Accordingly, it is desirable for the oxidation catalyst 4 to be designed in such a way that the greatest possible fraction of nitric oxide is converted to nitrogen dioxide, i.e., if possible, to a greater amount of nitrogen dioxide than is necessary for the reaction of the soot particles in the particle separator.

In view of the constantly changing operating conditions of an internal combustion engine operated in a motor vehicle, it is apparent that the desired greatest possible conversion rate of nitrogen oxides can be successfully achieved only by accepting a slight ammonia excess. In cases of insufficient conversion, to prevent toxic ammonia from being released to the atmosphere with the partially purified exhaust gas, an $NH_3$ oxidation catalyst 8 is installed downstream of the SCR catalyst to convert excess $NH_3$ to nitrogen and water vapor.

Instead of the particle separator used in the example of FIG. 1, it is possible to use a particle filter. The difference between a particle separator and a particle filter has already been explained. The interchangeability of particle separators and particle filters also applies to the examples described below even when this is not explicitly mentioned.

Figure 2:
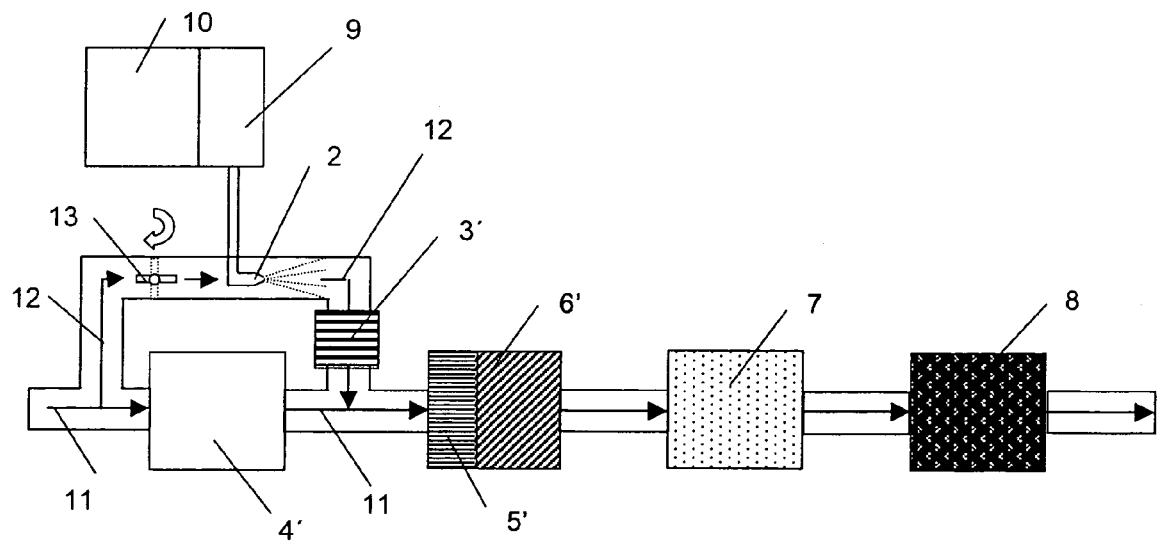
FIG. 2 shows an exhaust gas aftertreatment system in accordance with FIG. 1 with an automatically controlled split stream.

FIG. 2 shows another specific embodiment of the exhaust gas aftertreatment system of the invention. Since this example differs from the example of FIG. 1 only in the treatment of the reducing agent, only those parts which are different are described below. For parts that are the same as in the example of FIG. 1, the reader is referred to the related sections of the description of the example according to FIG. 1.

An oxidation catalyst 4' is located in the main stream of the exhaust gas 11. It oxidizes nitric oxide to nitrogen dioxide. A split stream of exhaust gas 12 is diverted from the main stream of exhaust gas 11. The split stream 12 is passed through a shut-off unit 13 that can be controlled by means of an engine control unit (not shown) as a function of operating parameters of the internal combustion engine. The function of the shut-off unit 13 is, on the one hand, to control mass flow and amount of exhaust gas in the exhaust gas split stream 12 as a function of the operating level of the internal combustion engine and, on the other hand, under certain operating conditions, e.g., during the engine braking operation of an internal combustion engine installed in a commercial vehicle, to prevent the backflow of exhaust gases loaded with isocyanic acid in the direction of the internal combustion engine. A metering device for the reductant, which is identical to the metering device described in connection with FIG. 1, is located downstream of the shut-off unit 13. To avoid repetition, we refer the reader to the pertinent passages of the description of the example according to FIG. 1.

A thermolysis catalyst 3' is again located downstream of the supply point for the reductant. It ensures decomposition of the reductant into isocyanic acid and ammonia, even under unfavorable temperature conditions. The exhaust gas split stream 12 opens back into the exhaust gas main stream 11 downstream of the oxidation catalyst 4', and the combined stream is fed to a hydrolysis catalyst 5' some distance from the thermolysis catalyst 3'. The reaction in the hydrolysis catalyst 5' is the same as the reaction described in connection with FIG. 1.

Figure 3:
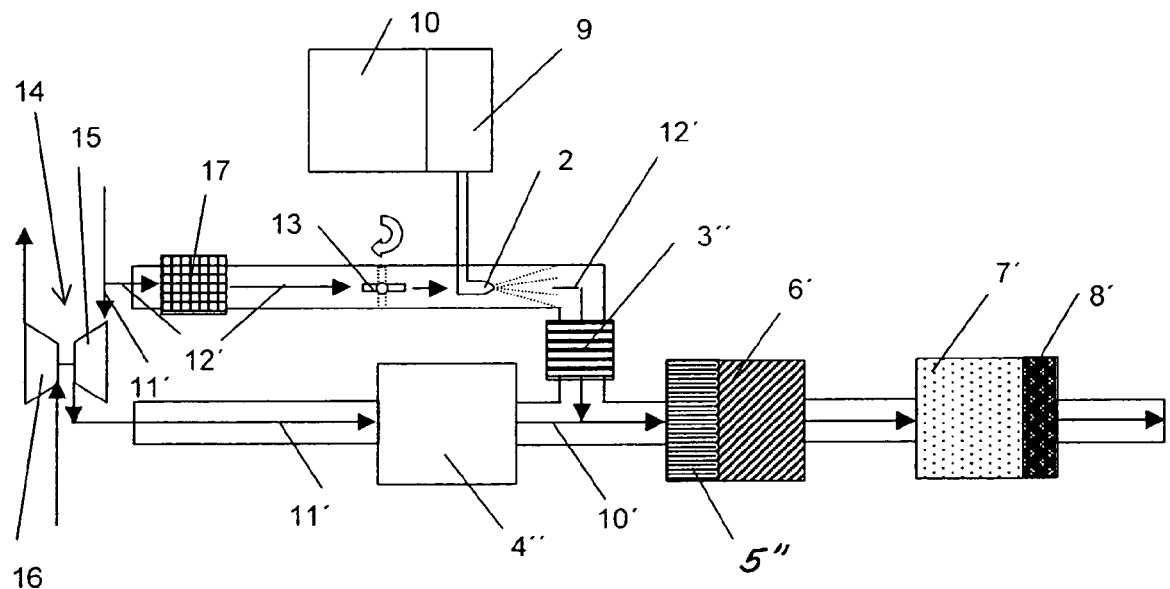
FIG. 3 shows an exhaust gas aftertreatment system for internal combustion engines with a turbosupercharger.

The distance between the thermolysis catalyst 3' and the hydrolysis catalyst 5' is important here, as it also is in the examples illustrated in FIGS. 1 and 3, because this separation makes it possible to realize a uniform distribution of the isocyanic acid, before the mixture enters the hydrolysis catalyst 5'. This uniform distribution contributes to optimum conversion in the hydrolysis catalyst, so that the formation of problematic reaction products, such as cyanuric acid, is prevented.

Downstream of the hydrolysis catalyst 5', the exhaust gas stream, which contains ammonia, is fed to the particle separator 6', the SCR catalyst 7 and the $NH_3$ oxidation catalyst 8, whose functions have already been explain in detail in connection with FIG. 1. Therefore, the reader is referred to the description of the example according to FIG. 1.

As the example of FIG. 2 shows, the hydrolysis catalyst 5' and the particle separator 6' can be installed in one housing.

An at least single-stage turbosupercharger system is usually present in internal combustion engines operated in today's commercial vehicles. A system of this type utilizes the heat content of the exhaust gas stream to compress the combustion air supplied to the internal combustion engine. This creates problems for the exhaust gas aftertreatment, because the exhaust gas flowing through the turbines of the exhaust gas turbosupercharger(s) is necessarily strongly cooled by them. A stream of exhaust gas cooled in this way is not capable of reaching sufficiently high exhaust gas temperatures for the thermolysis of the reducing agent, especially during the start-up operating phase and in the lower partial-load range. This problem is remedied by the system shown in FIG. 3.

As shown in FIG. 3, even before it reaches the turbine 15 of the exhaust gas turbosupercharger 14, the stream of exhaust gas coming from the internal combustion engine (not shown) splits into an exhaust gas main stream 11', which passes through the turbine 15 to drive the compressor 16, and an exhaust gas split stream 12'. The exhaust gas split stream 12' is passed over an oxidation catalyst 17, which, on the one hand, in the normal direction of flow of the exhaust gas that is indicated by the arrows, converts nitric oxide to nitrogen dioxide, and, on the other hand, e.g., in engine braking operation, oxidizes isocyanic acid or unreacted reductant that are possibly flowing back in the direction of the internal combustion engine. The oxidation catalyst 17 is followed downstream by a shut-off unit 13 in the exhaust gas split stream 12'. This shut-off unit 13 has the same design and function as the shut-off unit described in connection with FIG. 2. Downstream of the shut-off unit, the reducing agent is fed into the exhaust gas split stream 12' by a metering device 9, which has already been described in connection with FIG. 2. The relatively high exhaust gas temperature that prevails in the exhaust gas split stream 12' and the thermolysis catalyst 3" arranged downstream of the injection site cause the water content of the aqueous urea solution to vaporize and the urea to be preferentially converted to isocyanic acid. Parallel to the exhaust gas split stream 12', the exhaust gas main stream 11' is passed over an oxidation catalyst 4", which again converts the nitric oxide present in the exhaust gas to nitrogen dioxide. Downstream of the oxidation catalyst 4" in the exhaust gas main stream 11' and of the thermolysis catalyst 3" in the exhaust gas split stream 3", the parallel streams of exhaust gas come together again and flow through the downstream hydrolysis catalyst 5", where, as has already been explained, the hydrolysis of isocyanic acid to ammonia and carbon dioxide occurs. The hydrolysis catalyst is followed by a particle separator 6'. As has also already been explained in connection with the other embodiments, the soot particles deposited in the particle separator 6' are continuously reacted to form carbon monoxide, carbon dioxide, nitrogen, and nitric oxide by means of the nitrogen dioxide produced in the oxidation catalysts 4" and 17. The particle separator is followed downstream by an SCR catalyst 7', which converts the nitrogen oxides present in the exhaust gas to nitrogen and water vapor by selective catalytic reduction. To avoid ammonia slip, the downstream end region of the SCR catalyst 7' is coated with an active material that forms an $NH_3$ oxidation catalyst 8'.

If the turbine 15 is not of the type shown in the example according to FIG. 3 but rather is a twin-entry turbine, where one of the flows is fed with exhaust gas by a first number of cylinders, and the other flow is fed with exhaust gas by a second number of cylinders, then it is advantageous to split the exhaust gas split stream from one of the two flows. The cylinders of the flow from which the exhaust gas split stream is split can then be operated with different engine parameters (e.g., fuel injection times or quantities) from those of the cylinders of the other flow, so that an optimization of the conditions in the exhaust gas split stream with respect to the treatment of the reducing agent becomes possible in an advantageous way, for example, by raising the exhaust gas temperature in the start-up phase or in the low-load range, e.g., by an afterinjection in the expansion or exhaust stroke.

In internal combustion engines with two banks of cylinders, each of which usually has its own exhaust gas turbosupercharger, with the result that the turbine of one of the exhaust gas turbosuperchargers is supplied with exhaust gas from one of the banks of cylinders of the internal combustion engine, and the turbine of the other exhaust gas turbosupercharger is supplied with exhaust gas from the other bank of cylinders of the internal combustion engine, it is advantageous to split off the exhaust gas split stream from the stream of exhaust gas before the turbine of one of the two exhaust gas turbosuperchargers. The cylinders of the cylinder bank from whose exhaust gas tract the exhaust gas split stream is split off can then be operated with other engine parameters (e.g., fuel injection times or quantities) from those of the cylinders of the other cylinder bank, so that so that here, too, an optimization of the conditions in the exhaust gas split stream with respect to the treatment of the reducing agent becomes possible in an advantageous way, for example, by raising the exhaust gas temperature in the start-up phase or in the low-load range, e.g., by an afterinjection in the expansion or exhaust stroke.

With respect to the catalysts discussed in the preceding examples, it should be noted that they are solid catalysts or catalyst coatings. The active components of the catalysts can be applied on ceramic and/or metallic and/or silicate-containing and/or quartz-containing carriers. Metallic carriers, especially in the form of foil packets consisting of alternating corrugated and smooth foils, have been found to be especially effective for both the thermolysis catalysts and the hydrolysis catalysts. Many well-known manufacturing processes can be used to produce catalysts of this type, and the reader is referred to the pertinent technical literature on this subject.

Platinum and/or palladium and/or their oxides and/or zeolites can be used as active materials for the oxidation catalysts discussed in the preceding examples. Vanadium and/or vanadium pentoxide and/or titanium dioxide and/or tungsten oxide and/or copper-containing zeolites and/or iron-containing zeolites are used as active components for the SCR catalysts for reducing nitrogen oxides by means of ammonia.

Titanium dioxide and/or silicon dioxide and/or aluminum oxide and/or tungsten oxide and/or zeolites can be used as active components for the thermolysis catalysts for the preferential production of isocyanic acid and for the hydrolysis catalysts for converting the isocyanic acid to ammonia. In this regard, the composition of the active material of the thermolysis catalysts is different from the composition of the active material of the hydrolysis catalysts. For example, the thermolysis catalysts are to be designed especially for thermal stability, because they are exposed to very high temperatures, especially during full-load operation of the internal combustion engine. In addition, the thermolysis catalysts require high mechanical strength of the coating and carrier, so that they can withstand the impact of droplets of urea accelerated in the stream of exhaust gas. It has been found to be advantageous for the thermolysis catalyst to contain a smaller fraction of titanium dioxide than the hydrolysis catalyst. On the other hand, the thermolysis catalyst can be provided with a higher fraction of silicon dioxide, which has a thermally stabilizing effect, as well as aluminum oxide or tungsten oxide or mixtures of these materials.

The crystalline structure of the titanium dioxide also affects the reactivity and thermal stability of the coating. Therefore, it is advantageous if the fraction of titanium dioxide in the anatase modification is lower and/or the fraction of titanium dioxide in the rutile modification is higher in the thermolysis catalyst than in the hydrolysis catalyst. Although this decreases the reactivity of the thermolysis catalyst, this decrease is acceptable, because the thermal stability increases significantly.

It has been found to be especially advantageous if the percentage of anatase in the thermolysis catalyst is 0-30% and/or its percentage of rutile is 8-80% and/or its percentage of silicon dioxide is 30-100%.

On the other hand, it is advantageous if the percentage of anatase in the hydrolysis catalyst is 50-80% and/or its percentage of rutile is 0-30% and/or its percentage of silicon dioxide is 20-60%.

Figure 4:
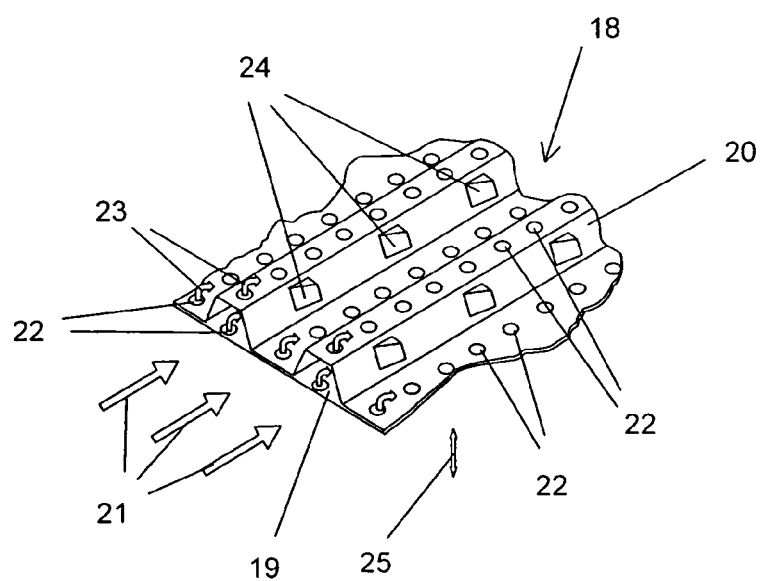
FIG. 4 shows a schematic drawing of a carrier structure.

FIG. 4 shows a schematic drawing of a section of an especially advantageous carrier structure for a thermolysis catalyst but especially for a hydrolysis catalyst. The drawing shows an arrangement of two adjacent foils from a packet of metal foils, in which layers of smooth foils 19 alternate with layers of corrugated foils 20. This sequence results in the formation of flow channels in the direction of flow of the main stream of exhaust gas indicated by the arrows 21. The exhaust gas can flow through these flow channels without very much flow resistance. To allow transverse flow 25 perpendicular to the smooth layers of foil 19 and the corrugated layers of foil 20, the foils are furnished with perforations 22, so that the mixture of exhaust gas, urea, and urea decomposition products can overflow from one layer to the next, as indicated by the arrows 23, with the result that the mixture of substances is effectively mixed and thus homogenized.

Especially where the hydrolysis catalyst is concerned, turbulent carrier structures of this type create an additional benefit in that, as in the case of particle separators, soot particles are deposited on the walls and are then continuously reacted, in the reaction that is already known from the particle separators, to form carbon monoxide, carbon dioxide, nitrogen, and nitric oxide by the nitrogen dioxide produced by means of an oxidation catalyst. This effect can be intensified by arranging projections 24 that are inclined, e.g., to the layers of corrugated foils 20, as seen in the main direction of flow, so that dead zones form in the flow shadows of the inclined projections 24. Soot particles are preferentially deposited in these dead zones.

Naturally, it can make sense to install several catalysts and/or particle separators in a common housing to save installation space and reduce costs. For example, it could be a good idea to integrate the hydrolysis catalyst and the particle separator in a common housing, and combining the hydrolysis catalyst, particle separator, SCR catalyst, and $NH_3$ oxidation catalyst can also make sense, especially in commercial vehicles. In addition, it is possible to realize the hydrolysis catalyst—when a suitable carrier structure is present—by coating part of the particle separator with suitable catalyst material.

Since the use of particle filters can be attended by clogging of the filters by oil incineration ash, it is useful to design the filters in such a way that they can be removed and thus easily cleaned.

To operate the exhaust gas aftertreatment system in its optimum operating range, the exhaust gas temperature and/or the content of nitrogen dioxide for the oxidation of particles can be varied. This is accomplished, for example, by adjustment of engine parameters and/or by raising the concentration of hydrocarbons by adjustment of engine parameters and/or by feeding hydrocarbons into the stream of exhaust gas upstream of the oxidation catalysts.

Naturally, the details described above can be modified in various ways with the technical information available to those who are skilled in the art without departing from the basic idea of the invention, so that the embodiments described here are understood to be nothing more than examples.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Exhaust gas aftertreatment system for reducing nitrogen oxides and particulates in a stream of exhaust gas from an internal combustion engines operated with a lean mixture, the system comprising:
   an oxidation catalyst arranged in a main stream of exhaust gas, the oxidation catalyst converting at least a portion of the nitric oxide present in the exhaust gas main stream to nitrogen dioxide,
   a reservoir containing a reducing agent comprising an aqueous urea solution;
   a metering device for metering the reducing agent into an exhaust gas split stream at a supply point parallel to the oxidation catalyst, wherein the exhaust gas split stream is split from the exhaust gas main stream upstream of the oxidation catalyst and returned to the exhaust gas main stream downstream of the oxidation catalyst, the reducing agent splitting off ammonia;
   a thermolysis catalyst located in the exhaust gas split stream downstream of the supply point of the reducing agent, the thermolysis catalyst reacting with the urea to form isocyanic acid and vaporizing the water component of the aqueous urea solution at an exhaust gas temperature above 135° C., the thermolysis catalyst being thermally stable at exhaust gas temperatures occurring near the engine;
   a hydrolysis catalyst located in the exhaust gas stream downstream of the return of the exhaust gas partial stream into the main stream of the exhaust gas, wherein the hydrolysis catalyst converts the isocyanic acid to ammonia and carbon dioxide with the aid of the water vapor formed in the thermolysis catalyst;
   a particle separator located in the exhaust gas stream downstream of the hydrolysis catalyst, the separator reacting with soot particles to form carbon monoxide, carbon dioxide, nitrogen, and nitric oxide by means of the nitrogen dioxideformed by the oxidation catalyst; and
   an SCR catalyst located downstream of the particle separator reducing the nitrogen oxides contained in the exhaust gas stream by selective catalytic reduction to nitrogen and water vapor using the ammonia formed by the hydrolysis catalyst.

2. The exhaust gas aftertreatment system of claim 1 wherein the thermolysis catalyst is resistant to the impact of droplets and is made of a material with greater thermal stability than the material of which the hydrolysis catalyst is made.

3. The exhaust gas aftertreatment system of claim 1 wherein the thermolysis catalyst contains at least one of titanium dioxide, silicon dioxide, aluminum oxide, tungsten oxide, and zeolite.

4. The exhaust gas aftertreatment system of claim 1 wherein the thermolysis catalyst has a porosity that promotes the evaporation of the water component of the aqueous urea solution.

5. The exhaust gas aftertreatment system of claim 1 wherein the hydrolysis catalyst comprises a carrier through which the exhaust gas can flow both in the main direction of flow of the exhaust gas and transverse to this direction in such a way that there is thorough mixing of the exhaust gas.

6. The exhaust gas aftertreatment system of claim 1 wherein the hydrolysis catalyst is coated with a washcoat containing at least one titanium dioxide, silicon dioxide, aluminum oxide, tungsten oxide, and zeolite.

7. The exhaust gas aftertreatment system of claim 1 wherein the hydrolysis catalyst has turbulence zones and low-flow zones with respect to the stream of exhaust gas, such that the hydrolysis catalyst deposits soot particles entrained with the stream of exhaust gas in the low-flow zones and reacts with them to form carbon monoxide, carbon dioxide, nitrogen, and nitric oxide with the aid of the nitrogen dioxide contained in the exhaust gas stream.

8. The exhaust gas aftertreatment system of claim 1 wherein titanium dioxide, the thermolysis catalyst containing a smaller fraction of titanium dioxide than the hydrolysis catalyst.

9. The exhaust gas aftertreatment system of claim 1 wherein the thermolysis catalyst and the hydrolysis catalyst both contain silicon dioxide, the thermolysis catalyst containing a higher fraction of silicon dioxide than the hydrolysis catalyst.

10. The exhaust gas aftertreatment of claim 1 wherein the thermolysis catalyst and the hydrolysis catalyst both contain anatase and rutile, the thermolysis catalyst containing one of a lower percentage of anatase and a higher percentage of rutile than the hydrolysis catalyst.

11. The exhaust gas aftertreatment system of claim 1 wherein at least one of:
 the percentage of anatase in the thermolysis catalyst is 0-30%;
 the percentage of rutile in the thermolysis catalyst is 8-80%; and
 the percentage of silicon dioxide in the thermolysis catalyst is 30-100%.

12. The exhaust gas aftertreatment system of claim 1 wherein at least one of:
 the percentage of anatase in the hydrolysis catalyst is 50-80%;
 the percentage of rutile in the hydrolysis catalyst is 0-30%; and
 the percentage of silicon dioxide in the hydrolysis catalyst is 20-60%.

* * * * *